BY *Fred N. Schwend*
ATTORNEY

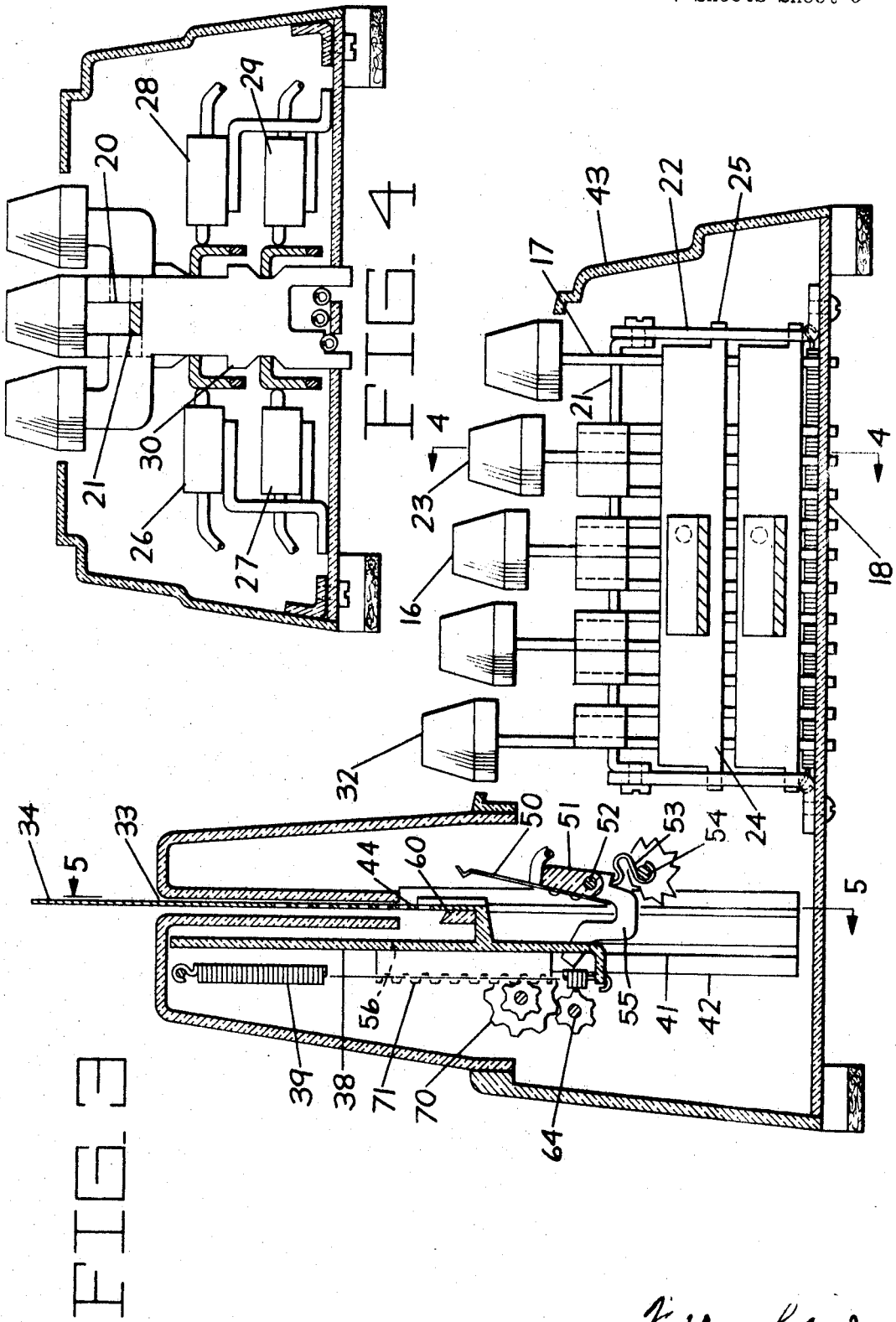

May 26, 1970     F. N. SCHWEND     3,514,754
CREDIT VERIFICATION SYSTEM
Filed Sept. 8, 1967     7 Sheets-Sheet 4
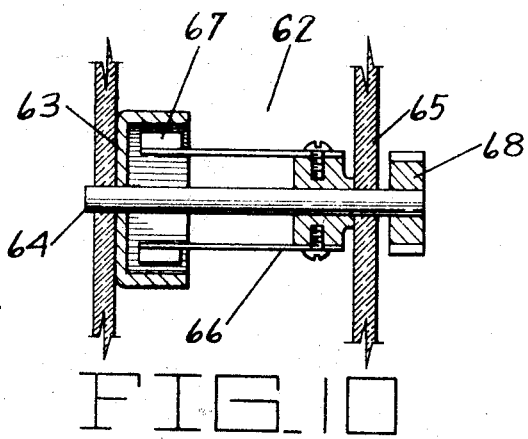
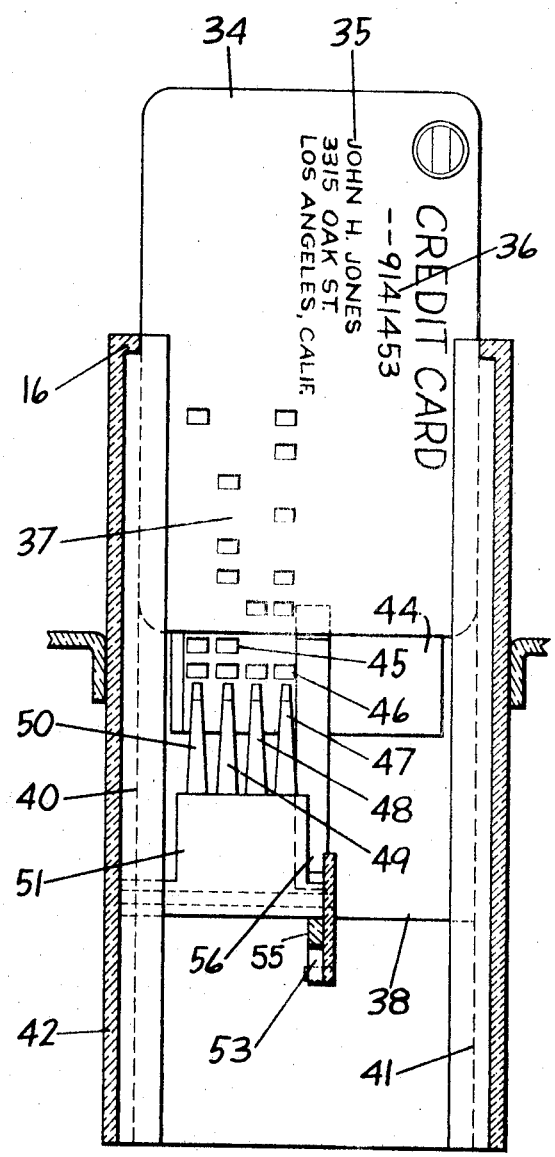
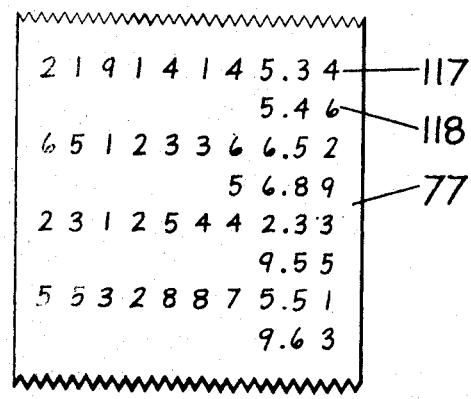
BY *Fred N. Schwend*
ATTORNEY May 26, 1970     F. N. SCHWEND     3,514,754
CREDIT VERIFICATION SYSTEM
Filed Sept. 8, 1967     7 Sheets-Sheet 5
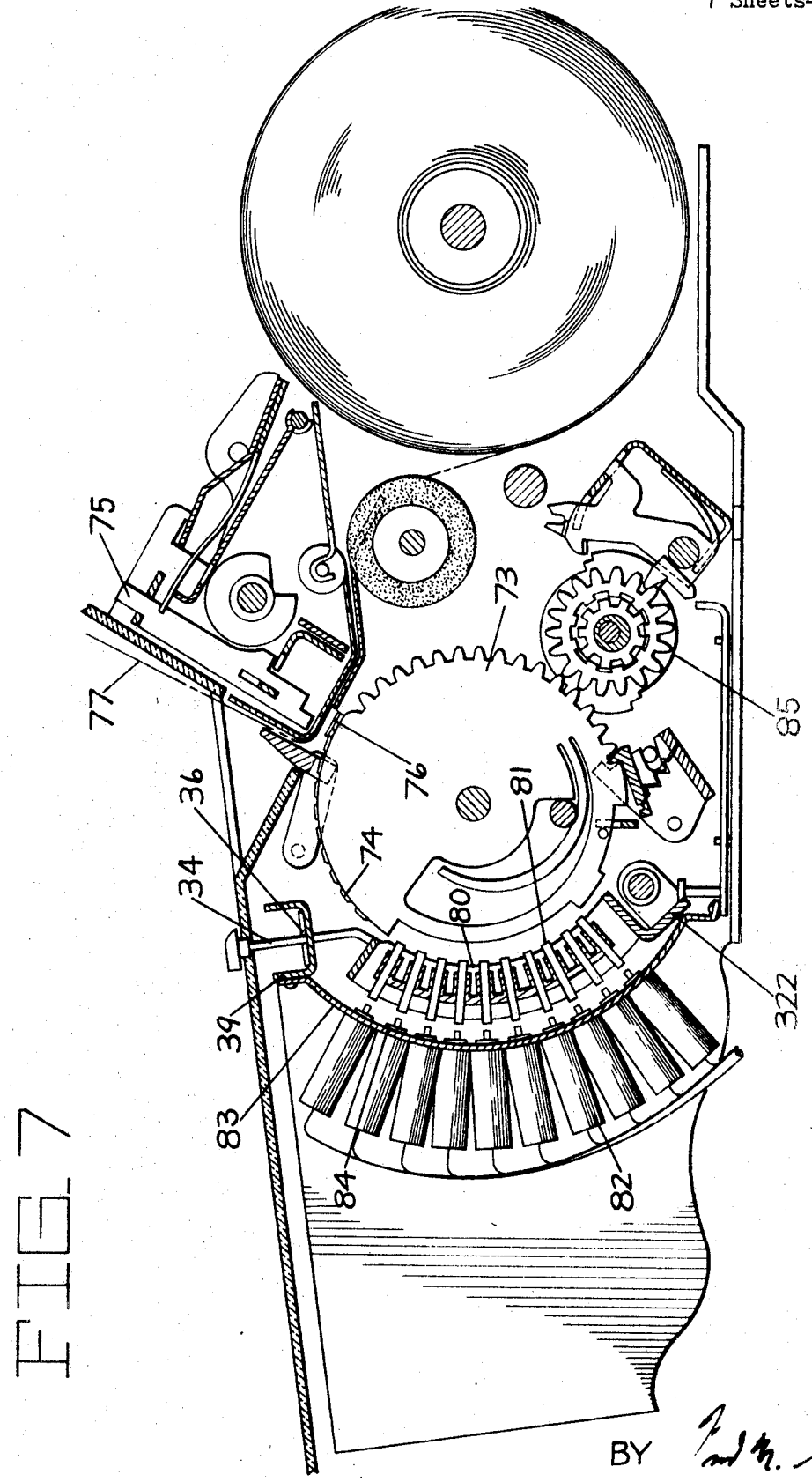
FIG_7
BY *Fred N. Schwend*
ATTORNEY May 26, 1970   F. N. SCHWEND   3,514,754
CREDIT VERIFICATION SYSTEM
Filed Sept. 8, 1967   7 Sheets-Sheet 7

BY *Fred N. Schwend*
ATTORNEY

United States Patent Office 3,514,754
Patented May 26, 1970

3,514,754
CREDIT VERIFICATION SYSTEM
Fred N. Schwend, Arcadia, Calif., assignor to Clary Corporation, San Gabriel, Calif., a corporation of California
Filed Sept. 8, 1967, Ser. No. 666,388
Int. Cl. H04q 9/00; G08b 5/00
U.S. Cl. 340—149                                    10 Claims

ABSTRACT OF THE DISCLOSURE

A credit verification system utilizing a credit card having a field of coded punched holes identifying all but a few digits of a customer's credit account number, in which the card is placed in a slot at any of several point-of-sale stations. Electrical sensing means senses the holes and transmits the account number to a registering machine at a central station wherein both the account number and the number of the point-of-sale station is recorded. The remaining digits of the account number are entered in a keyboard and transmitted separately to prevent use of credit cards by unauthorized persons.

---

This invention relates to an information transmitting system and has particular reference to a system utilizing a credit card for verifying a credit or charge account to determine if a customer's account is in good standing and to reliably identify such account.

Credit card systems are becoming more and more popular for purchasing different types of items and services on credit. However, such cards do not indicate in themselves if the customer's account is in good standing or if, in fact, the credit card rightfully belongs to the person submitting it.

Heretofore, when a customer submitted a credit card to a sales person in a department store, airline ticket office or the like, for purchase of an item or service on credit, the sales person would generally telephone the customer's account number to a central office where credit files are kept and the files would be checked to determine the credit standing of the customer. This not only takes time but is susceptible to error and is a source of annoyance to the sales person. Accordingly, there is a tendency, especially when a sales person has a number of customers waiting for him, to omit such credit check. Other more sophisticated systems have been proposed in which the customer's account number is entered in a keyboard at the point of sale and is transmitted by wire to a central processing unit or office where the customer's account is either automatically or manually checked. Such system also requires a certain amount of time and work on the part of the sales person and is susceptible to errors in entering the number in the keyboard.

In most of the prior art systems, such as those noted above, no records are kept of credit inquiries and therefore there is no ready way of proving at a later date that such credit checks have been made. Also, in such prior art systems there is no way of determining whether or not a submitted credit card is actually the property of the customer or is a stolen or counterfeited card.

Therefore, it becomes a principal object of the present invention to provide a credit verifying system utilizing a credit card, which system is easy to operate and takes a minimum amount of time and effort on the part of a sales person.

Another object is to provide a credit verifying system of the above type in which a record is made of each credit inquiry.

Another object is to provide a credit verifying system of the above type which determines whether the customer offering a credit card is the rightful owner of such card.

Another object is to provide a credit verifying system of the above type which is simple and inexpensive to manufacture.

The manner in which the above and other objects of the invention are accomplished will be readily understood on reference to the following specification when read in conjunction with the accompanying drawings, wherein:

FIG. 3 is a longitudinal sectional view through an inquiry unit.

FIG. 4 is a transverse sectional view through the inquiry unit and is taken along the line 4—4 of FIG. 3.

FIG. 5 is a transverse sectional view taken substantially along the line 5—5 of FIG. 3.

FIG. 6 is a front view of a specimen paper strip as printed at the verification station.

FIG. 7 is a longitudinal sectional view of a data registering machine located at the verification station.

FIG. 10 is a sectional view illustrating the speed governor for controlling the speed of the credit card.

Figure 1:
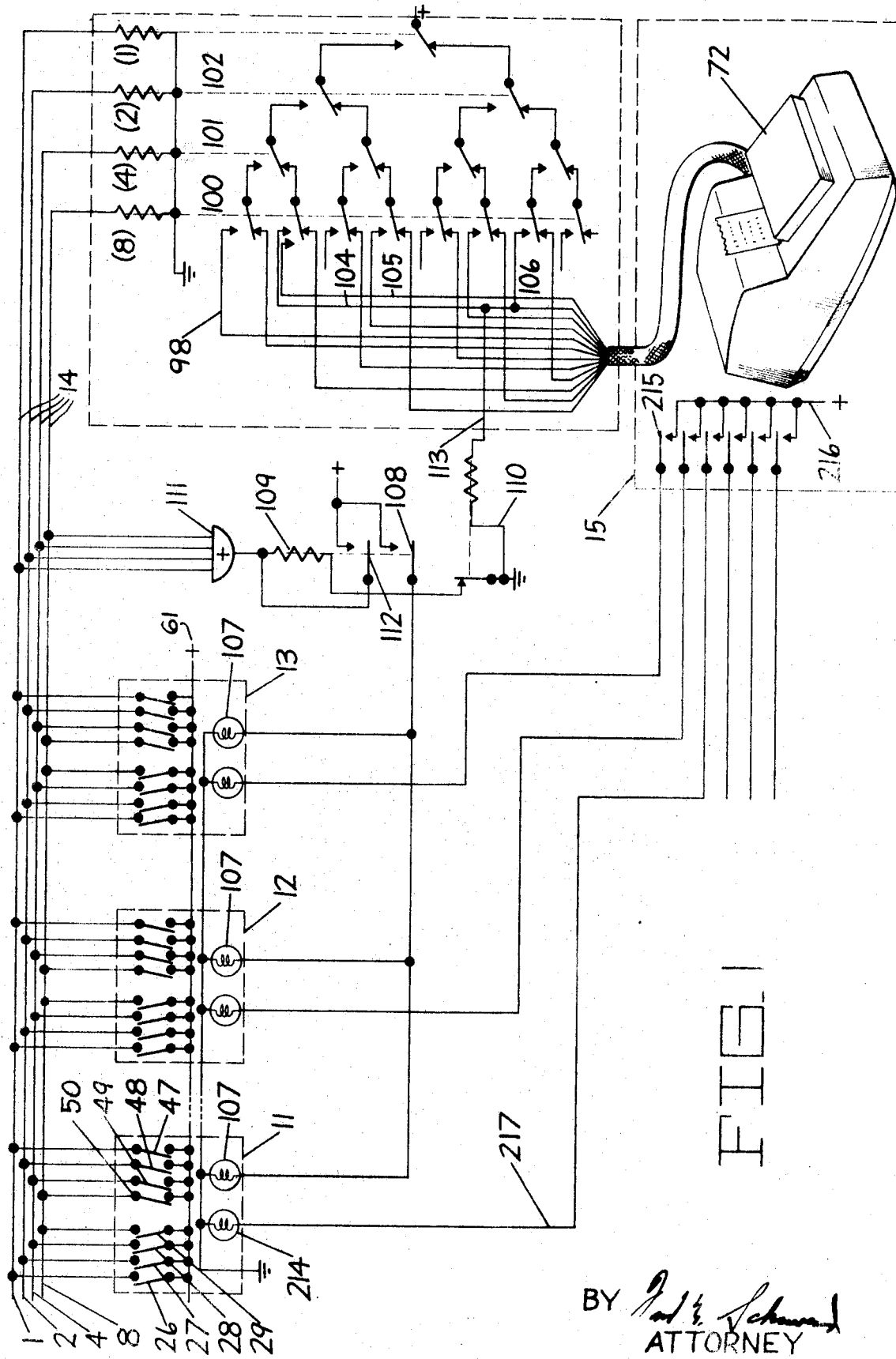
FIG. 1 is a schematic view illustrating a credit verification system embodying one form of the present invention.

In general, the verification system comprises a plurality of transmitting or inquiry stations diagrammatically indicated at 11, 12 and 13 (FIG. 1). Although only three are shown, any number may be employed. Such stations may be located at the various points of sale in a department store, supermarket, airline ticket agencies, etc., and are connected through a trunk cable 14 to a central verification or data processing station diagrammatically indicated at 15.

Each of the inquiry stations comprises a ten-key keyboard generally indicated at 16 (FIGS. 2–4), each key of which has a keystem 17 slideably mounted at its lower end in a guide slot formed in a bottom plate 18. Each keystem also has a vertical slot 20 slideably embracing a guide bar 21 attached at its ends to vertical brackets 22.

Figure 2:
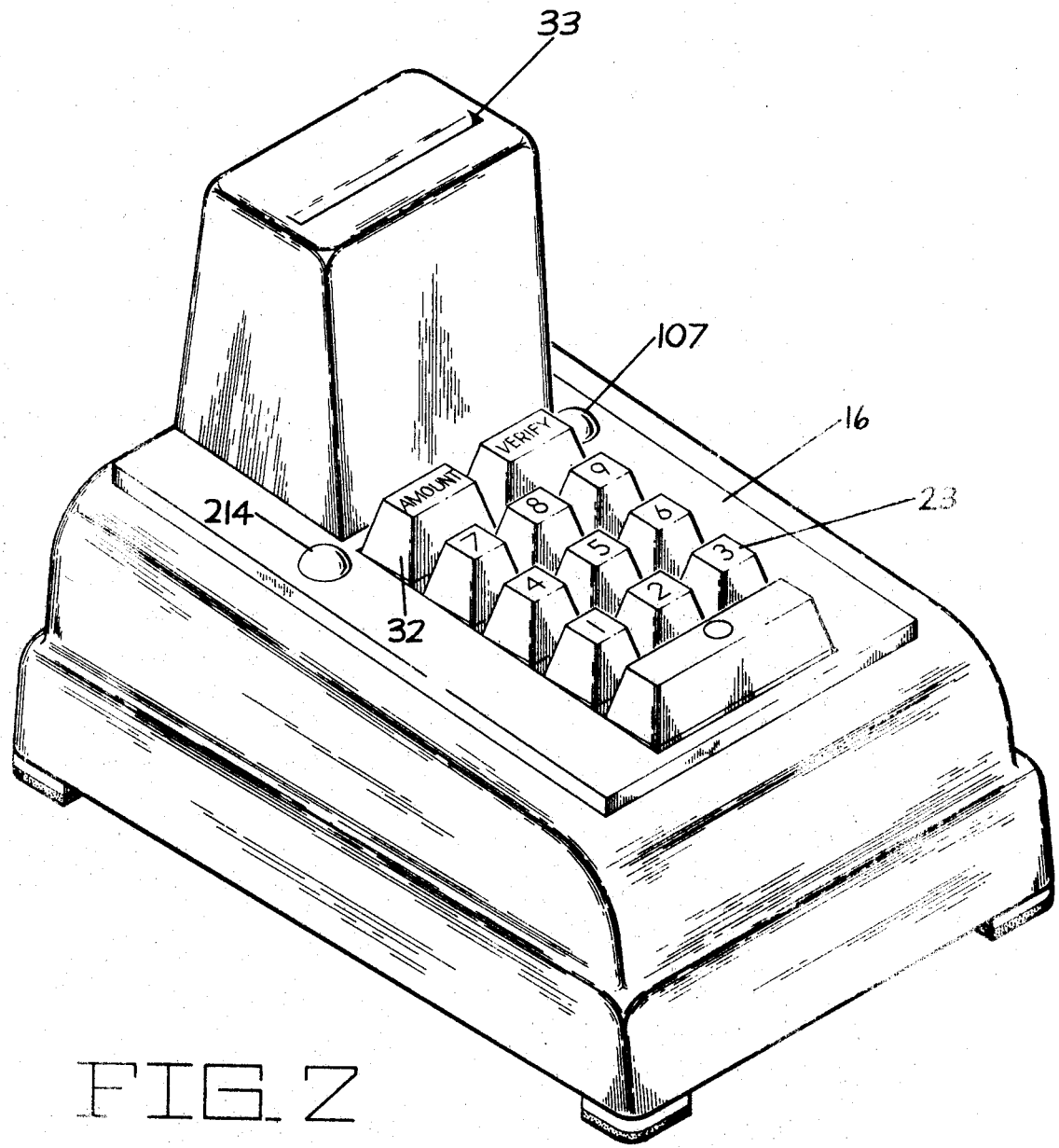
FIG. 2 is a perspective view of one of the inquiry units.

Certain of the keystems are offset at their upper ends so that keytops 23 may be arranged in laterally extending rows, as shown in FIG. 2.

Four bails 24 extend along the various keystems and are pivoted at 25 in the brackets 22. The bails engage the plungers of respective normally open switches 26, 27, 28 and 29 which have spring elements (not shown) therein which yieldably hold the bails against the side edges of the various keystems.

Each keystem has one or more cam lobes 30 thereon effective upon depression of the respective key to rock one or more of the bails 24 and thus close the switches associated therewith. Such cam lobes are arranged according to a particular code which, in the present case, is based on the binary series. For example, the switch 26 is assigned the binary value "1," switch 27 the binary value "2," switch 28 the binary value "4" and switch 29 the binary value "8." Thus, depression of the number 2 key would, for example, close the switch 28 and depression of the number 7 key would close the switches 26, 27 and 28. The zero key is provided with two lower cams 30 on opposite edges which are effective upon depression of such key to close switches 27 and 29.

Two additional control keys 31 and 32 are provided whose keystems are so arranged as to close switches representing together the decimal values 11 and 12, respectively, the purpose of which will become apparent later on.

The switches 26–29 are electrically connected to respective ones of the four lines constituting the trunk 14.

Directly behind the keyboard is a card slot 33 for receiving a plastic credit token or card 34. The latter preferably has embossed thereon the name 35, FIG. 5, and an account number 36 which at least partly identifies the customer's account. The embossed sections of the card 34 may thus be used to imprint bills, shipping labels or the like in the usual manner. The card also has a field of punched holes 37 representing in coded form the account number 36. In this case, the holes are coded according to the binary series, each horizontal row of holes (as seen in FIG. 5) representing one digit of the account number.

A slide 38, preferably of plastic, is mounted behind the slot 33 and is guided vertically in guide slots 40 and 41 formed in guide members 42 integral with the cover 43. The slide 38 has a relatively thin upwardly projecting section 44 integral therewith and extending in the plane of the card 34 when the latter is inserted in its slot. A field of two rows of holes 45 and 46 are formed in the section 44. The upper row represents in coded form the identification number of the inquiry station in which the unit is located and the lower row represents the decimal value 11, the purpose of which will be described later.

In line with the various vertical columns of holes in the credit card 34 and section 44 are four flexible switch contact blades 47–50 which are electrically connected to respective ones of the conductors of trunk 14.

The contact blades 47–50 are carried by a block 51 of insulating material which is supported by a pivot pin 52. A toggle spring 53 extending between the block 51 and a fixed stud 54 normally holds the contact blade out of engagement with the section 44 (as shown in FIG. 3). An arm integral with the block 51 extends into a slot 56 formed in the slide 38.

When the card 34 is inserted in the slot 33 and in edge guide slots and pressed downward to carry the slide 38 against the action of a tension spring 39 to a fully inserted position at the bottom of its travel, the upper edge of slot 56 will engage arm 55 and rock the block 51 counterclockwise until the contact blades 47–50 engage the side of the card 34. As pressure on the card 34 is then released, the spring 39 returns the slide and card upward toward a retracted position, causing the contact blades to wipe along the surface of the card and project through the different holes therein into engagement with a contact bar 60 which is suitably insulated from the rest of the unit and connected to a source of power 61.

A speed governor generally indicated at 62 is provided to regulate the upward movement of the card 34. Such regulator comprises a stationary friction element 63 (see also FIG. 10 in the form of a stationary cylindrical cup 163 which is located concentric to a rotatable shaft 64 carrying a hub 65 to which are attached the ends of a pair of diametrically opposed leaf springs 66. Brake shoes 67 are carried by the outer ends of the leaf springs and when the shaft 64 reaches a predetermined speed, the shoes 67 will fly outwardly to frictionally engage the cup 163 and thus regulate the speed of shaft 64. The shaft 64 is driven by the slide 38 and for this purpose it carries a gear 68 meshing with the larger element of a compound gear 70, the smaller element of which meshes with a gear rack 71 formed integral with the slide 38.

The data registering machine located at the verification station 15 and generally indicated at 72 (FIGS. 1 and 7) is basically similar to the well-known commercially available Addmaster Adding Machine with the addition of electromagnetic controls thereto, as will be described in detail hereinafter. Reference is hereby made to the H. L. Clary et al. Pat. 9,132,582, issued on May 12, 1964, for details of the basic Addmaster Machine. Therefore, only those portions of the machine which relate to, or form a part of, the present invention will be described in detail herein. However, it is to be understood that the invention is not limited to the particular machine disclosed and may be applied to any similar machine.

In general, the machine 72 comprises a plurality of independently rockable, denominationally arranged type sectors 73 carrying type characters 74 ranging in value from 0 to 9. The sectors 73 cooperate with vertically movable print hammers 75 to transmit an imprint from different type characters 74 through a printing ribbon 76 and onto a paper tape 77 guided between the ribbon 76 and the type hammers 75 from a supply roll 78.

A pin carriage 80 carrying settable pins 81 is shiftable laterally of the machine in the manner disclosed in the above Clary et al. patent to control the extent of clockwise movement of the different sectors 73. However, in lieu of a keyboard for setting the pins 81, a row of solenoids 82 is provided, the latter being supported by a curved bracket 83 in an arc concentric with the sectors 73. Each of the solenoids carries an armature 84 effective when such solenoid is energized to set an aligned one of the pins 81 in position to limit rotation of movement of one of the sectors 73.

An accumulator generally indicated at 85 is provided. The latter has registering gears movable into mesh with digitizing gear teeth formed on the sectors 73 whereby the accumulator may be digitized during a machine cycle.

Figure 8:
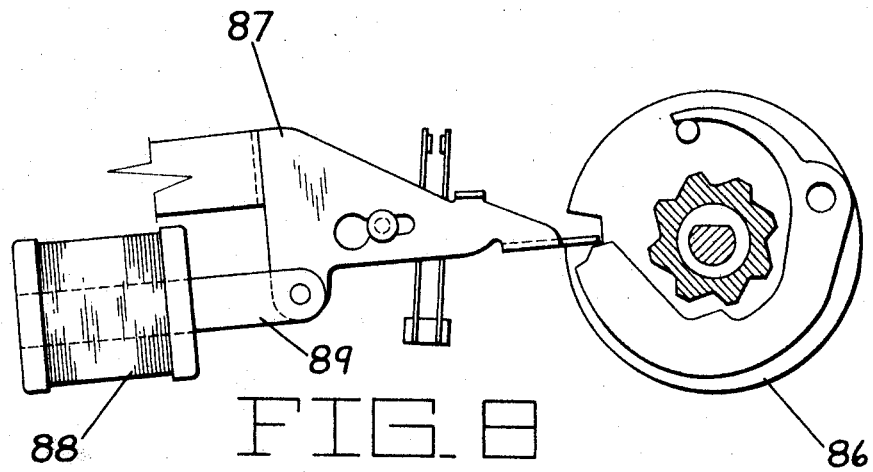
FIG. 8 is a sectional view illustrating the cyclic clutch control for the registering machine.

The machine 72 is driven by suitable electric motor (not shown) through a cyclically operable clutch 86 (FIG. 8). The latter is controlled by a clutch control slide 87 which is normally held in its righthand illustrated position to maintain the clutch disengaged.

The clutch 86 is engaged to cause a cycle of operation of the machine by means of a solenoid 88 whose armature 89 is connected to the slide 87. Upon energization of the solenoid 88 the slide 87 is drawn to the left, enabling engagement of clutch 86 to drive the machine through a cycle.

Figure 9:
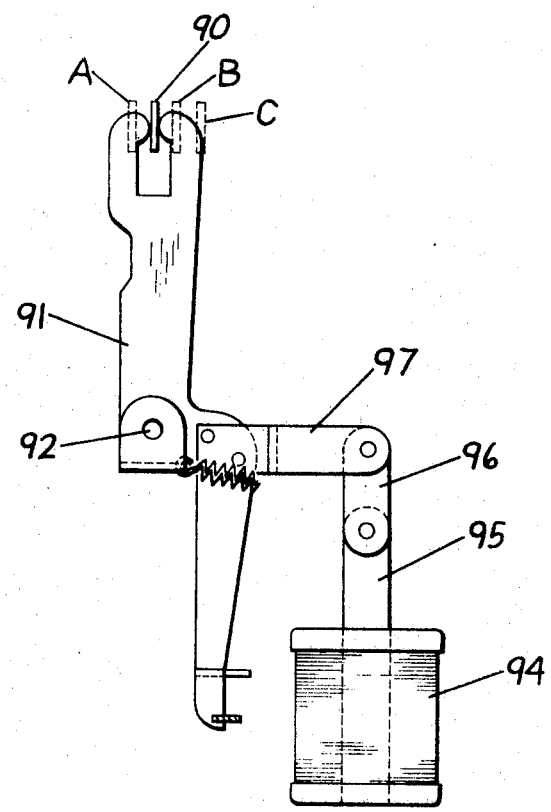
FIG. 9 is a detail view illustrating the non-add controls for the registering machine.

Meshing engagement of the accumulator 85 with the sectors 73 for digitation and totalling purposes is controlled by the setting of an ear 90 (FIG. 9) (forming part of a bail 253, shown in FIGS. 5, 6 and 24 of the above Clary et al. patent) into its full line position or either of its dotted line positions $a$ and $b$ of FIG. 9, which cause certain control cams (not shown) to move the accumulator into meshing engagement with the sectors 73. Movement of the ear 90 is effected by a lever 91 pivotally supported at 92 and rocked by certain controls (not shown). However, by moving the ear 90 an additional alternate position indicated by the dot and dash lines $c$, the accumulator can be maintained out of cooperative relation with the sectors 73 during a machine operation, resulting in non-add operations. For this purpose, a solenoid 94 is provided having its armature 95 connected through a link 96 to an arm 97 suitably attached to the lever 91. Upon energization of the solenoid, the lever 91 is swung clockwise to locate the ear 90 in its alternate position $c$ against the action of a tension spring 99.

In order to energize the different solenoids 82 in accordance with the particular depressed ones of keys 23 or in accordance with the digit values of the account number 36 on an inserted credit card, such solenoids are connected to respective contacts of a well-known relay tree type decoding arrangement generally indicated at 98 (FIG. 1) located at or adjacent the station 15. The latter comprises four relays 100, 101, 102 and 103, the windings of which are connected to respective ones of the trunk lines 14.

The solenoid 88 is energized to cause operation of the machine upon depression of either of the control keys 31 and 32 or automatically at the end of a scanning operation of the credit card 34 and for this purpose the solenoid 88 is connected in a manner not shown to a line 104 (FIG. 1). When the relays 100, 102 and 103 are energized (to represent the decimal value 11) upon depression of the key 32 or upon scanning of the lowest row of holes 46 in the slide 38, a circuit will be completed to such solenoid. Also, when the relays 100 and 101 are energized (to represent the decimal value 12) upon depression of the key 32 a circuit will be completed through conductors 106 and 104 to solenoid 88.

The solenoid 94 is energized to cause a non-add operation of the machine whenever the key 31 is depressed or the slide 38 and credit card approach the upper ends of their travel. For this purpose, the solenoid 94 is connected to line 105 so as to complete a circuit to such solenoid when the relays 101, 102 and 103 are energized representing the decimal value 11.

Means are provided to indicate at all inquiry stations whenever one of such stations is being used to transmit data either by entering the same in the respective keyboard or by scanning an inserted credit card and for this purpose an indicator lamp 107 is mounted on the inquiry unit of each station. Such lamps are connected in circuit with normally open contacts 108 of a relay 109, the coil of which is connected in series with the normally closed contacts of a relay 110 and with the output of an "or" gate 111, the inputs of which are connected to respective ones of the trunk lines 14. Thus, when any of the trunk lines 14 is energized, the gate 111 will transmit a signal to relay 109, energizing the same. Locking contacts 112 will now close to hold the relay 109 energized, thus lighting all of the indicator lamps 107, warning salespersons at other inquiry stations to withhold inquiry operations until the present inquiry transmission is completed. At the end of an inquiry transmission, i.e., upon depression of either the keys 31, 32 or scanning of the lowermost row of holes 46 on the slide 38, a signal will be applied over line 113 to energize relay 110 and thus cause the relay 109 to drop out.

In order to prevent the use of stolen or counterfeit credit cards and to detect the same, the first two digits of a customer's account number are preferably not embossed or punched in his card but are kept in the file of his account at the verification station 15. Accordingly, in verifying the account, when the customer presents his card 34 to a salesperson, he also tells her the first two digits from memory. The salesperson first enters such two digits in the keyboard whereupon they are transferred to the registering machine 72 and accordingly set up on the pin carriage. Thereafter, the salesperson inserts the credit card and upon release the field of holes 37 in the card is scanned and the account number transferred to the pin carriage of the registering machine. As the contact blades 47 scan the upper row of holes 45 in the slide 38, representing the number of the department or inquiry station, such number is also transferred to the pin carriage of the machine. Subsequently, upon scanning the lower row 46 of holes in the slide, the decimal signal 11 is transmitted, causing the machine to print but not add such number. Accordingly, the number will be printed, as shown at 117 (FIG. 6) on the tape 77. The last digit will represent the number of the department. The credit clerk, upon reading the number may then check the credit files to determine if the customer's account is in good standing.

If desired, the amount of the transaction may also be transmitted to the clerk so that she may determine if such amount is within the limit set for the particular customer. In this event, the amount of the transaction is subsequently set into the keyboard and upon depression of the "amount" key 32 it will be printed on line 118 on the tape. Since the solenoid 94 is not energized upon depression of key 32, this amount will be summed by the accumulator 85 so that at the end of the day, or other period, the accumulator will contain the sum of all transactions entered in the keyboard.

In order to indicate to the salesperson whether or not a customer's credit is in good standing a second lamp 214 is provided at each inquiry station. Such lamps are connected through respective lines, i.e., line 217, and individual switches 215 located at the verifying station to a source of power 216. If a customer's credit is approved the credit clerk may, for example, close an appropriate switch 15 to apply a steady signal to the lamp in the respective inquiry station but if credit is disapproved the clerk may repetitively close the appropriate switch to apply a flashing signal to the inquiry station.

Figure 12:
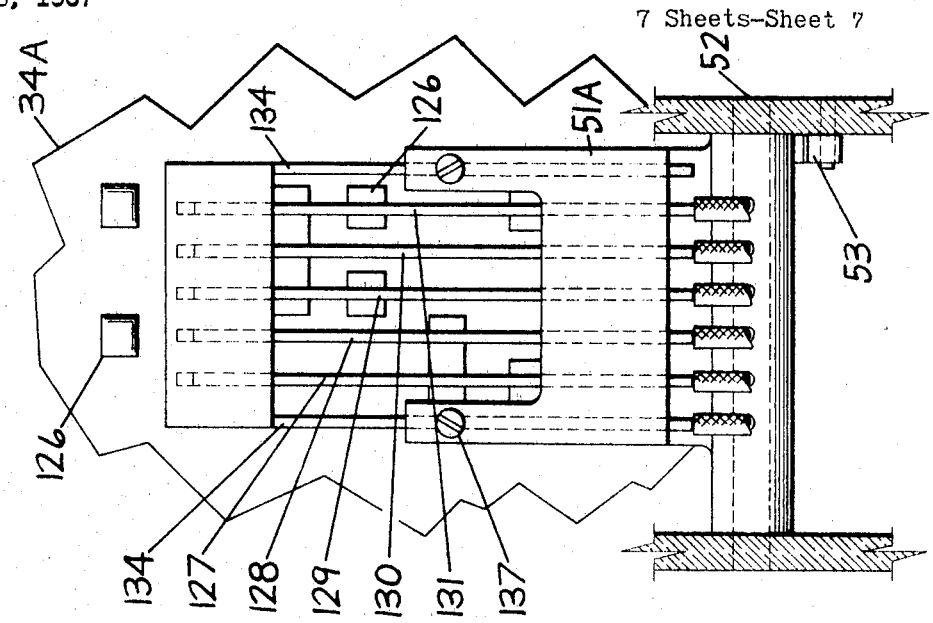
FIG. 12 is a front view of the sensing device shown in FIG. 11.
Figure 11:
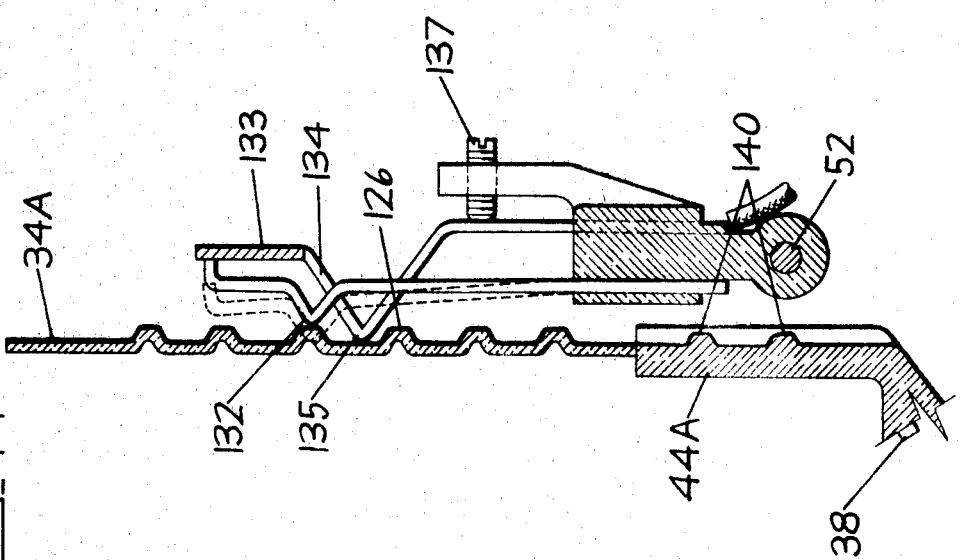
FIG. 11 is a sectional side view of a modified form of card sensing device.

FIGS. 11 and 12 are enlarged fragmentary views of a modified form of card sensing device for sensing a plastic credit card 34a having a field of embossed projections 126 thereon in lieu of holes. In this case, the digits of the customer's account are represented by a 2 out of 5 bit code in which each digit is represented by two laterally aligned projections 126 located in different columns. Such code permits the use of any well known parity checking circuit. The remainder of the card sensing device is similar to that shown in FIGS. 3 and 5.

Five flexible wire contacts 127 to 131 are embedded in the supporting block 51a which is pivoted on the pin 52 and each is aligned with a respective column of projections. Each wire contact has a camming formation 132 which is cammed outward by a said projection 126 as the card moves upwardly causing the same to move from its dot-dash line position, shown in FIG. 11, to its full line position wherein it contacts with a common contact plate 133 supported by flexible arms 134 also embedded in the block 51a. The arms 134 are somewhat stiffer than the wire contacts and also have camming formations 135 which ride along the surface of the card on opposite sides of the field of projections 126. Such arms are held in wiping contact with the surface of the card 34a by a overcenter spring 53. Set screws 137 are carried by extensions of the block 51a and engage the arms 134 to permit accurate adjustment of the contact plate 133 relative to the wire contacts.

As is well known, plastic credit cards tend to warp somewhat due to heat, handling, etc., although the particular area which includes the field of projections is relatively small and therefore only a relatively small amount of warpage normally exists in that locality. However, since the contact plate supporting arms 134 ride over the surface of the card directly adjacent the field of holes, they maintain the contact plate 133 in substantially the same relationship with the wire contacts (regardless of the generally warped condition of the card) as when the card is perfectly flat and thereby enable a safe opening and closing of the wire contacts even though the heights of the projections 126 are relatively small.

The conductor bar 60 is omitted in this case and accordingly the section 44a of the slide 38, which carries additional embossed projections 140, may be made of substantially greater thickness than that of the credit card.

Although the invention has been described in detail and certain specific terms and languages have been used, it is to be understood that the present disclosure is illustrative rather than restrictive and that changes and modifications may be made without departing from the spirit or scope of the invention, as set forth in the claims appended hereto. For example, other types of more sophisticated verification apparatus may be provided, such as punched tape or magnetic tape files which may be directly interrogated from the trunk lines 14.

Account numbers having more or less digits may be accommodated. Also, by providing two or more rows of holes 45 in the section 44 of slide 38, any desired number of inquiry stations may be associated with the system and identified in printed form on the tape 77.

If a customer has lost or misplaced his credit card but knows his account number, the salesperson may enter such entire number in the keyboard and depress the "verify" key 31 to transmit the same to the registering machine.

I claim:

1. An information transmitting system for use with a card having a plurality of rows of coded formations representing an identification number;
comprising a data processing station including means for registering said number,
a transmitting station,
said transmitting station comprising means for receiving said card for movement from a retracted position to an inserted position,
yieldable means for returning said card from said inserted position to said retracted position,
a plurality of electrical switch elements adapted to be controlled by respective ones of said rows of coded formations on said card,
said switch elements being normally out of the paths of said formations,
means responsive to insertion of said card to substantially said inserted position for moving said switch elements into the paths of said formations,
means responsive to movement of said card to substantially said retracted position for removing said switch elements from the paths of said formations, and
means operatively connecting said switch elements with said registering means.

2. An information transmitting system according to claim 1 comprising speed governing means for controlling the speed of said card during movement of said card from said inserted position to said retracted position.

3. An information transmitting system according to claim 1 comprising
a member operable by said yieldable means and movable with said card during movement of said card between said inserted position and said retracted position, and
coded formations on said member,
said last mentioned formations being effective to control said switch elements during movement of said member and said card from said inserted position to said retracted position.

4. An information transmitting system according to claim 1 comprising overcenter spring means for alternately holding said switch elements in and out of the paths of said formations.

5. An information transmitting system according to claim 4 wherein said overcenter spring means alternately holds said switch elements in and out of engagement with said card.

6. An information transmitting system according to claim 1 wherein said transmitting station comprises a keyboard including depressible keys, electrical switch elements controlled by said keys, and means electrically connecting said last mentioned switch elements with respective ones of said first mentioned switch elements.

7. An information transmitting apparatus for use with a card having a plurality of rows of coded formations representing an identification number;
comprising a slide,
means for guiding said slide in an endwise movement,
spring means for normally maintaining said slide in a retracted position,
a plurality of electrical switch elements adapted to be controlled by respective ones of said rows of coded formations on said card,
said switch elements being normally out of the paths of said formations,
means responsive to movement of said slide to a second position by said card for moving said switch elements into the paths of said formations, and
means responsive to movement of said slide to substantially said retracted position for removing said switch elements from the paths of said formations.

8. An information transmitting system for use with cards, each having a plurality of rows of coded formations representing an identification number;
comprising a data processing station including means for registering a number,
a plurality of transmitting stations,
each of said transmitting stations comprising means for receiving a said card for movement from a retracted position to an inserted position and vice versa,
a member movable with said card during movement of said card between said inserted position and said retracted position,
a coded formation on said member representing an identification number of the respective said transmitting station,
a plurality of electrical switch elements adapted to be controlled by respective ones of said rows of coded formations on said card and on said member during movement of said card between said inserted position and said retracted position, and
means operatively connecting said switch elements with said registering means.

9. An information transmitting system according to claim 8 wherein means are provided for preventing said switch elements from being controlled by said coded formations during movement of said card from said retracted position to said inserted position.

10. An information transmitting system for use with a card having a plurality of rows of coded formations representing an identification number;
comprising a data processing station including a cyclically operable apparatus for registering said number,
a transmitting station,
said transmitting station comprising means for receiving said card for movement from a retracted position to an inserted position and vice versa,
a member movable with said card during movement of said card between said inserted and said retracted position,
a coded formation on said member,
a plurality of electrical switch elements adapted to be controlled by respective ones of said coded formations on said card and on said member during movement of said card between said inserted position and said retracted position, and
means operatively connecting said switch elements with said registering apparatus,
said coded formations on said card controlling said switch elements to enter said identification number in said apparatus, and
said coded formation on said member controlling said switch elements to initiate a cycle of operation of said apparatus.

References Cited

UNITED STATES PATENTS 3,035,764  5/1962  Beman _____ 235—61.9
3,419,710  12/1968  Mathews et al. ____ 200—46 XR

OTHER REFERENCES

IBM Technical Disclosure Bulletin, vol. 9, No. 12 May 1967 pp. 1760–1761. G. W. Bowers, Jr., et al.

DONALD J. YUSKO, Primary Examiner

U.S. Cl. X.R.

200—46